United States Patent [19]
Klein et al.

[11] 4,321,340
[45] Mar. 23, 1982

[54] PROCESS FOR FORMING A POWDERED SULFONATED EPDM TERPOLYMER (C-951)

[75] Inventors: Robert R. Klein, Berkeley Heights; Henry S. Makowski, Scotch Plains, both of N.J.

[73] Assignee: Exxon Research & Engineering Co., Florham Park, N.J.

[21] Appl. No.: 136,365

[22] Filed: Apr. 1, 1980

[51] Int. Cl.³ .................... C08F 8/36; C08C 19/20
[52] U.S. Cl. .................... 525/344; 525/212; 528/500; 528/502
[58] Field of Search .............. 260/33.6 A, 42.33; 525/189, 212, 344

[56] References Cited

U.S. PATENT DOCUMENTS

| | | | |
|---|---|---|---|
| 3,284,393 | 11/1966 | Vanderhoff | 526/911 X |
| 3,468,833 | 9/1969 | Meincke | 526/911 X |
| 3,642,728 | 2/1972 | Canter | 525/344 |
| 3,801,531 | 4/1974 | Berejka | 260/33.4 |
| 4,131,586 | 12/1978 | Makowski | 525/344 X |
| 4,147,677 | 4/1979 | Lundberg et al. | 260/23.5 A |
| 4,187,206 | 2/1980 | Brenner | 260/23.5 A |

Primary Examiner—C. A. Henderson
Attorney, Agent, or Firm—Richard E. Nanfeldt

[57] ABSTRACT

The present invention relates to a process for the forming of a powdered composition of a sulfonated EPDM terpolymer, having less than 1.25 wt. % ENB wherein the powder has a particle size distribution of from about 500 to about 3,000 microns, a water content of less than 2 wt. %, and a sulfonate content of less than 250 meq./100 g polymer.

8 Claims, 1 Drawing Figure

PROCESS FOR FORMING A POWDERED SULFONATED EPDM TERPOLYMER (C-951)

BACKGROUND OF THE INVENTION

1. Field of the Invention

The present invention relates to a process for the forming of a powdered composition of a sulfonated EPDM terpolymer, having less than 1.25 wt. % ENB wherein the powder has a particle size distribution of from about 500 to about 3,000 microns, a water content of less than 2 wt. %, and a sulfonate content of less than 250 meq./100 g polymer.

2. Description of the Prior Art

Recently, a new class of thermoelastic sulfonated polymers has been described in a number of U.S. Patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form a sulfonated elastomeric polymer. The olefinic sites of the elastomeric polymer are sulfonated by means of a complex of a sulfur trioxide donor and a Lewis base. The sulfonate groups of the sulfonated elastomer can be readily neutralized with a basic material to form an ionically cross-linked elastomer having substantially improved physical properties over an unsulfonated elastomer at room temperature. However, these ionically cross-linked elastomers may be processed like conventional thermoplastics at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups IA, IB, IIA, IIB and aluminum, iron, cobalt and lead and mixtures thereof of the Periodic Table of Elements. Although these sulfonated elastomeric polymers prepared by the process of this patent are readily usable in a certain number of limited applications, they are not as readily adaptable for blending with fillers and oil extenders and polyolefinic resins due to their inability to be formed as a powder but rather being produced as large particle size pellets ($\geq \frac{1}{8}''$).

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the sulfonated elastomeric polymers are organic amines. Again, these compositions were not produced as powders.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions formed by this process are again not powders.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of this invention are not powders.

Products resulting from the aforementioned methods for obtaining neutralized sulfonated elastomeric compositions are not capable of being readily blended with extenders to produce homogeneous dry blends.

SUMMARY OF THE INVENTION

It has been found surprisingly that powdered compositions of sulfonated EPDM terpolymers having less than 1.25 wt. % ENB can be readily manufactured by an improved process wherein the powder has a particle size distribution of about 500 to about 3,000 microns and a volume density of about 10 lb/ft$^3$ to about 25 lb/ft$^3$.

It is well known in the fabrication of polymers that the dispersion of extenders into a polymeric matrix during compounding is directly related to the size of the polymeric particle. As the particle size of the polymer decreases, the surface area of the polymer increases, thereby permitting the polymeric matrix to more readily wet the surface of fillers thereby improving the dispersion of the filler into the matrix. Although many thermoplastic resins can be cryogenically ground into fine powders, powders of sulfonated and unsulfonated elastomeric polymers, due to their low Tg, are not readily obtainable by this cryogenic process. Such cryogenically ground polymers are non-porous and, at equivalent particle diameters, are of lower surface area than the powders produced in this improved process.

GENERAL DESCRIPTION

Figure 1:
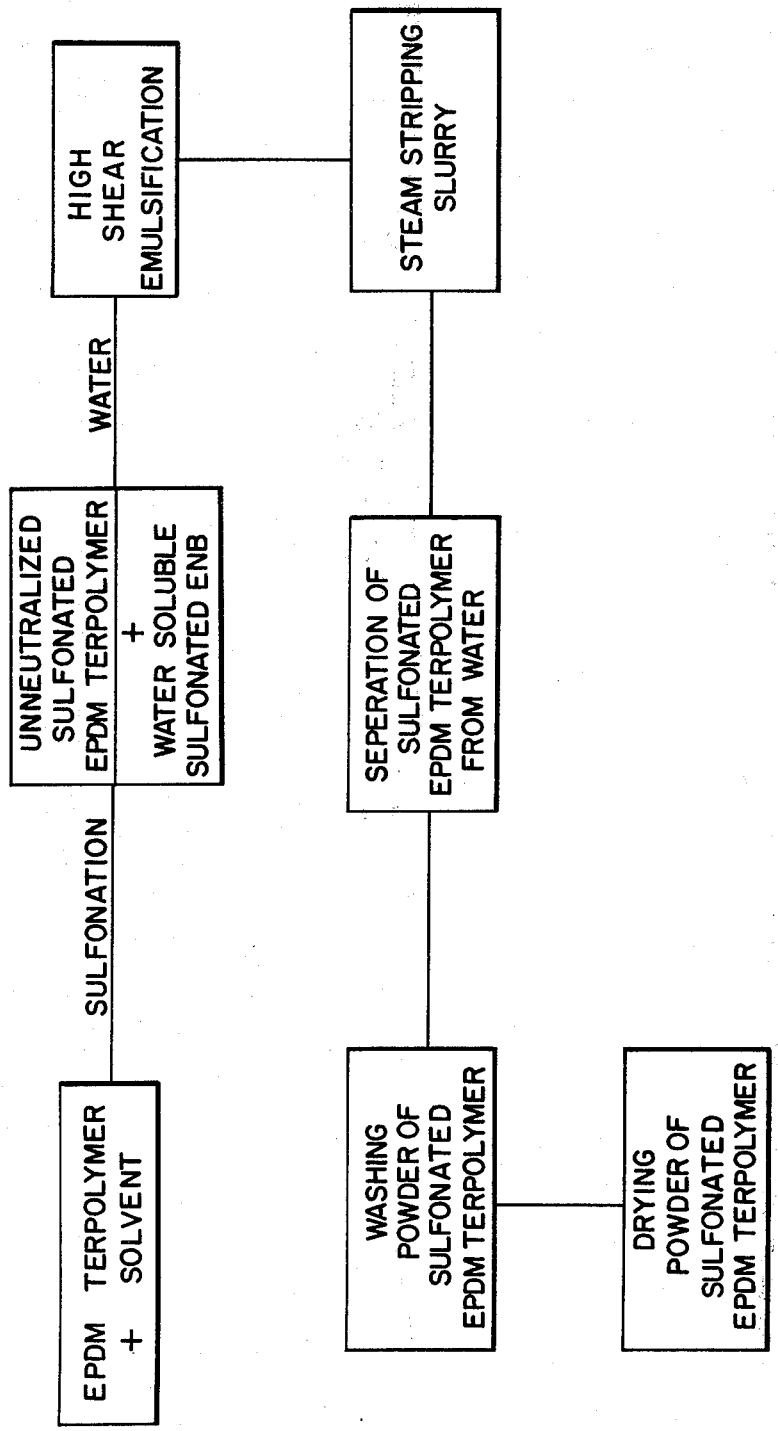
FIG. 1 illustrates a schematic drawing of the described processes of the instant invention.

The present invention relates to improved processes for the formation of sulfonated EPDM terpolymers having less than 1.25 wt. % ENB therein.

The EPDM terpolymers of the instant invention are low unsaturated polymers having about 1 to about 10.0 wt. % olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt. % ethylene and about 1 to about 10 wt. % of a diene monomer, the balance of the polymer being propylene. Preferably, the polymer contains about 50 to about 70 wt. % ethylene, e.g. 50 wt. % and about 2.6 to about 8.0 wt. % diene monomer, e.g., 5.0 wt. %. The diene monomer is preferably a non-conjugated diene. Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene. Some examples of useful EPDM terpolymers are Vistalon 2504 and 2504-20 (Exxon) and Nordel 1320 (du Pont).

The EPDM terpolymers of this invention have a number average molecular weight (M̄n) as measured by GPC of about 10,000 to about 200,000, more preferably of about 15,000 to about 100,000, and most preferably of about 20,000 to about 60,000. The Mooney viscosity (ML, 1+8, 212° F.) of the EPDM terpolymer is about 5 to about 60, more preferably about 10 to about 50, most preferably about 15 to about 40.

This invention involves the preparation of powders of ionic-containing polymers. The ion-containing polymer, preferably a sulfonate containing EPDM terpolymer, is dissolved in an organic solvent, which is largely immiscible with water, or in a mixture of such organic solvent and a polar cosolvent, such as an alcohol or an amine, which is largely miscible with water. The major solvent in the binary solvent mixture is preferably the water immiscible organic solvent. The minor component polar cosolvent functions to dissociate the ionic associations and thereby promotes solution of the ion-containing polymer. Most systems employ the binary solvent. Single solvent systems require low ionic group content and are limited to the least ionic cations.

The cements of the ion-containing polymers can be prepared from preformed and isolated polymers through resolution. Preferably the cements are those which exist at the end of the manufacturing process, prior to dry polymer isolation.

When cements of ion-containing polymers are contacted with water a marked increase in cement viscosity or the formation of a gel occurs. When the cement is composed of a single organic solvent viscosity increases or gelation occurs through the interaction of water with the ionic groups thereby resulting in an increased degree of association of the ion-containing polymer chains. When the cement is composed of a binary solvent the water also serves to remove the solubilizing polar cosolvent. Thus in the process of this invention the water is not simply serving as a dispersion medium but exercises a vitally important function in the formation of powders.

When the cements of ion-containing polymers are contacted with water under high shear very small particles of cement dispersed in water are formed. The polar cosolvent, if present, is rapidly extracted into the water phase, and water rapidly diffuses into the organic phase to effect marked viscosity increases in the cement particle or a gelation of the particle. When essentially gelled the particle can be considered a crosslinked polymer swollen by solvent. If the crosslinking is high then the cement viscosity is very high and gel strength very high. Under these conditions the swollen particle is extremely stable and will not agglomerate with other such particles. Particle stability is not the result of emulsifiers or other such stabilizing compounds but is due simply to the high viscosity or high gel strength of the cement. When the cement of the EPDM terpolymer having monomeric ENB therein is sulfonated with a sulfonating agent both sulfonated EPDM terpolymer and the sulfonate derivative of the monomeric ENB are formed. When the cement of the mixture of sulfonated EPDM terpolymer and the sulfonate derivative of the monomeric ENB are subjected to high shear blending with water, the sulfonated derivative of the monomeric ENB is solubilized in the water phase whereas the sulfonated EPDM terpolymer forms particles within the water phase. During the water washing step of the particles of the sulfonated EPDM terpolymer subsequent to steam stripping the water soluble sulfonate derivative of the monomeric ENB are effectively removed from the particles of the sulfonated EPDM terpolymer.

Once such dispersions are prepared they are very stable and can be stored for long periods without substantial agglomeration. In addition, because of the high gel strength of the swollen particle not only is agglomeration of the particles substantially prevented but also adhesion of the particles to surfaces is prevented. Thus, one significant advantage of this process is that little if any fouling occurs either during the preparation of the dispersion or during the solvent stripping operation with hot water.

The stripping of the solvent from the swollen particle is promoted by the small size of the particle. Solvent stripping is not only very rapid but also very efficient. In addition, when the solvent is stripped the particle remains very porous since the gel network remains during and after solvent removal and the solvent is thereby replaced by empty space.

The wet powders are more readily dried because of their high surface areas in equipment such as tunnel dryers, fluid bed dryers, tray dryers, vacuum dryers, and the like. This overall process permits the isolation and drying of ion-containing polymers which are unable to be melt processed, i.e., which possess melt viscosities so high that they cannot be extruded.

The powders prepared according to the process of this invention possess many advantages over polymers which are much larger in size and which are not porous. In thermoelastic applications the polymer is formulated with a wide variety of fillers, extenders, and other additives in order to reduce material cost while improving the properties of the composition. Normally this sort of mixing is conducted with high shear energy intensive mixers. While this is indeed possible with the powders of this invention it is preferred that the powders be dry-mixed with the various ingredients to obtain a well-dispersed, homogeneous blend which requires little additional mixing on fluxing. The dry mixes can be charged directly to injection molders where the fluxing and little additional mixing provides for a uniform and well-dispersed article. These dry mixes also permit the formulation of ion-containing polymers which possess such high melt viscosities that the mixing of such polymers with large particle sizes results in poor dispersion, poor rheological properties, and poor properties of the final article.

The small size and porous nature of the powders produced according to the instant process also allows for very rapid solution of the ion-containing polymers either in single solvent or binary solvent systems. Rapid solution is not only very desirable but absolutely necessary in some applications for economical operation in respect to both time and energy saving. Additionally, the sulfonated EPDM terpolymers of the instant invention show marked improvements in physical properties as compared to sulfonated EPDM terpolymers having more than 1.25 wt. % of the sulfonated derivative of the monomeric ENB therein, since the inclusion of the sulfonated derivative of the monomeric ENB in the sulfonated EPDM terpolymer does not promote effective ionic crosslinking or the maximization of the polymeric network. The sulfonated EPDM terpolymers of the instant invention have less than about 1.25 wt. % of the sulfonated derivative of the monomeric ENB, more preferably about 0.2 to about 1.0 wt. %, and most preferably about 0.2 to about 0.8 wt. %. The instant process permits the effective removal of the sulfonated derivative of the monomeric ENB from the sulfonated EPDM terpolymer because of the porous nature of the particles of the sulfonated EPDM terpolymers of the instant invention, whereas the sulfonated EPDM terpolymers formed by the processes of U.S. Pat. Nos. 3,642,728; 3,836,511 and 3,847,854 are not porous thereby permitting effective water penetration thereby facilitating effective removal of the water soluble sulfonated derivative of the monomeric ENB.

The EPDM terpolymer is dissolved in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane isohexane, or heptane. The cement of the EPDM terpolymer is contacted with a sulfonating agent in a reaction zone at a temperature of about $-10°$ C. to about 100° C. for a period of time of about 1 minute to about 120 minutes, most preferably for about 5 to about 90 minutes; and most preferably about 15 to about 60. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene, or triethylphosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in chlorinated aliphatic or aromatic hydrocarbon.

It should be pointed out that neither the sulfonating agent nor the manner of sulfonation is critical in producing the unneutralized sulfonated EPDM terpolymer provided that the sulfonating method does not degrade the polymer backbone. The unneutralized sulfonated polymer has about 5 to about 250 meq. sulfonate groups per 100 grams of sulfonated polymer, more preferably about 7 to about 200, and most preferably about 10 to about 175. The meq. of sulfonate groups/100 grams of polymer is determined by both titration of the polymeric sulfonate and Dietert Sulfur Analysis. In the titration of the sulfonated EPDM terpolymer, the polymer is dissolved in suitable solvent at a concentration level of 50 grams per liter of solvent. The dissolved sulfonated polymer is titrated with ethanolic sodium hydroxide to an Alizarin-Thymolphthalein endpoint.

The unneutralized sulfonated EPDM terpolymer is gel free and hydrolytically stable. Gel is measured by stirring a given weight of polymer in a solvent at a concentration of 5 wt. % for 24 hours, allowing the mixture to settle, withdrawing a weighed sample of the supernatant solution and evaporating to dryness. Hydrolytically stable means that the acid function, in this case the unneutralized sulfonated polymer, will not be eliminated under neutral or slightly basic conditions to a neutral moiety which is incapable of being converted to highly ionic functionality.

Neutralization of the unneutralized sulfonated EPDM terpolymer is done by the addition of a solution of a basic salt wherein a counterion of the basic salt is selected from the group consisting of ammonium and Group IA of the Periodic Table of Elements, to the unneutralized sulfonated elastomeric polymer dissolved in a suitable solvent or mixture of solvents. The basic salt is dissolved in a binary solvent system consisting of water and/or an aliphatic alcohol.

The monovalent counterions (cations) of these basic salts are selected from the group consisting of ammonium, lithium, sodium, potassium and cesium and mixtures thereof, wherein the preferred monovalent counterions (Group IA) are sodium or potassium. The anion of the basic salt is selected from a carboxylic acid having from about 1 to about 4 carbon atoms a hydroxide or alkoxide having about 1 to about 4 carbon atoms and mixtures thereof. The preferred neutralizing agent is a metal hydroxide, more preferably sodium hydroxide. Sufficient base is added to the solution of the unneutralized sulfonated elastomeric polymer to effect neutralization. It is preferable to neutralize at least 95% of the sulfonate groups, more preferably about 98%, most preferably 100%.

The metal or ammonium sulfonate-containing polymers at the higher sulfonate levels possess extremely high melt viscosities and are thereby difficult to melt process. The addition of ionic group plasticizers markedly reduces melt viscosity and frequently enhances physical properties.

To the solution of the neutralized sulfonated EPDM terpolymer can be added a preferential plasticizer selected from the group consisting of carboxylic acid having about 5 to about 30 carbon atoms, more preferably about 8 to about 22 carbon atoms, and the zinc and lead salts of these carboxylic acids. The carboxylic acids are selected from the group consisting of lauric, myristic, palmitic, or stearic acids and mixtures thereof; e.g. zinc stearate, lead stearate, or zinc laurate.

The preferential plasticizer is incorporated into the neutralized sulfonated EPDM terpolymer at less than about 60 parts by weight per 100 parts by weight of the sulfonated EPDM terpolymer, more preferably at about 8 to about 40, and most preferably at about 10 to about 25. The metallic salt of the carboxylic acid can also be used as neutralizing agent. In the case of the neutralizing agent and plasticizer being the identical chemical species, additional metallic salt is added over the required levels of neutralization. Alternatively, other preferential plasticizers are selected from amines, carbonates, amides, such as stear-amide and ammonium and amine salts of carboxylic acids and mixtures thereof. The preferred plasticizers are selected from carboxylic acids having about 5 to about 30 carbon atoms or metallic salts of the carboxylic acid and mixtures thereof.

To the neutralized sulfonated EPDM terpolymer in the cement can be added a non-polar backbone process oil. The oils employed in the present invention are non-polar process oils having less than about 2 wt. % polar-type compounds as measured by molecular-type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F., a viscosity of about 70 to about 3000 ssu's at 100° F. and a number average molecular weight of about 300 to about 1000, and more preferably about 300 to 750. The preferred process oils are paraffinics. Table I illustrates typical oils encompassed by the scope of this invention. The oils are incorporated into the blend composition at a concentration level of about 20 to about 200 parts by weight per 100 parts by weight of the sulfonated EPDM terpolymer, more preferably at about 20 to about 175, and most preferably at about 25 to about 150.

TABLE I

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Aromatic | Flexon 340 | 120 | | 1.3 | 70.3 | 28.4 |
| Naphthenic | Flexon 765 | 505 | | 0.9 | 20.8 | 78.3 |

The process of the instant invention generally includes dissolving an EPDM terpolymer in the non-reactive solvent, as previously defined, to form a cement wherein the concentration of the polymer in the cement is about 1.0 to about 40.0 g/100 ml of cement, more preferably about 5.0 to about 30.0 and most preferably about 10.0 to about 25.0 The cement is contacted with a sulfonating agent, as previously defined and sulfonation of the EPDM terpolymer is effected according to the previously defined procedures, thereby forming an unneutralized sulfonated EPDM terpolymer. The sulfonated reaction is quenched with a quenching agent such as methanol. To the cement of the sulfonated polymer derivative can be added an amine or a basic salt of a monovalent or multivalent cation to neutralize the sulfonate groups as previously defined, thereby forming a cement of metal or ammonium neutralized sulfonated polymer. To the cement of the metal or ammonium neutralized sulfonated polymer can be added the preferential plasticizer or non-polar process oil. To the cement of the unneutralized sulfonated EPDM terpolymer or the metal or ammonium neutralized sulfonated EPDM terpolymer is added water at volume ratio of water to cement of about 60 to 1 to about 2 to 1, more preferably about 20 to 1 to about 2 to 1 and most preferably about 4 to 1 to about 2 to 1. The blend of water and the cement of the unneutralized or neutralized sulfonated EPDM terpolymer is then subject to high shear emulsification to form a slurry of cement particles containing the ionic polymer in water.

The ability of cements to function in this invention is dependent upon the viscosity of the cement particle after contacting with water. The cement particle may contain not only the ion-containing polymer but also fillers, extender oils, and other additives. Thus it is difficult to define the basic parameters of the ion-containing polymer with regard to the ultimate gel strength of the water-contacted particle. However, ion-containing polymers which are useful in the practice of this invention are those which possess a melt viscosity at 200° C. and at a shear rate of 0.88 sec$^{-1}$ of at least about $10^4$ poise, preferably at least about $5 \times 10^4$ poise, and most preferably at least about $10^5$ poise.

Emulsification of the cement can be done batchwise using equipment such as a Waring Blender, Gifford Wood laboratory mixer or a Barinco mixer. It can also be done continuously using commercially available emulsification equipment such as a Greerco hi-shear pipeline mixer, a Tekmar Dispax emulsion mill or a colloid mill. The continuous process for the formation of the cement slurry in water using equipment such as a 2" Greerco hi-shear pipeline mixer is conducted with rotor speeds of about 5000 RPM's to about 10000 RPM's, more preferably about 7500 to about 10000 and most preferably about 8000 to about 10000. Further fine particle sizes with narrow size distribution can be obtained by using the Greerco tandem shear head configuration and by increasing the residence time of the slurry under the high shear conditions. This can be done by recycling the slurry through the mixer at recycle rate of about 1 to 1 to about 10 to 1 which is substantially the same as reducing the slurry flow rate through the mixer by the same ratios. Fine uniform particles can also be obtained by processing the slurry through a series of mixers in line, that is, process the slurry through from about 2 to about 4 mixers in series. The mixers in this series configuration can also be operated with recycle in the range given above. The slurry is subjected to a solvent flashing operation such as in a batch steam stripper, thereby effecting removal of the solvent. The slurry of particles in water of the fine powder of the unneutralized or the metal or ammonium neutralized sulfonated EPDM terpolymer is further washed with additional water to effect the removal of the water soluble sulfonated derivative of the monomeric ENB and subsequently filtered. The filtered particles of the fine powder of the unneutralized or metal or ammonium neutralized sulfonated EPDM terpolymer are mechanically dewatered in a device such as a two roll mill, a dewatering extruder or sludge press to a water content of less than about 20 wt. % water, more preferably less than about 15 wt. % and most preferably less than about 10 wt. %. The particles are then hot air dried in a fluid bed dryer or flash dryers or tunnel dryers to a water content of less than about 2 wt. % of water, more preferably less than about 1 wt. %, and most preferably less than about 0.5 wt. %. The formed and dried powder particles have a volume density of about 15 to about 30 lbs/cubic foot, more preferably about 18 to about 25, and most preferably about 20 to about 25.

The particle size distribution of the formed powder can be measured by sieve analysis wherein the weight % retained on U.S. Sieve Number Screens is:

TABLE II

| U.S. Sieve Screen Number | Retained Powder wt. % |
|---|---|
| 10–20 | about 60 to about 95 |
| 20–40 | about 3 to about 36 |
| 40–60 | about 0.5 to about 3.0 |

The formed powder can be readily dry blended with various chemical additives such as the previously-mentioned preferential plasticizers or non-polar process oils or with fillers, polyolefinic thermoplastics or waxes and mixtures thereof. The blend composition of the powder and additive can be compounded on a two-roll mill or fed directly into an extruder in order to be extruded or injection molded directly into a finished article. Other methods known in the art which are suitable for making these compositions include those methods employed in the plastic and elastomer industries for mixing polymer systems. An excellent polymer blend composition of this invention can be obtained through the use of a high-shear batch intensive mixer called the Banbury. Alternatively, economic advantages in terms of time and labor savings can be obtained through the use of a Farrel Continuous Mixer, a twin screw extruder, or extrusion techniques which are continuous mixing type equipment. The Banbury mixing device is the preferred batch-type mixer, and the twin screw extruder is the preferred continuous mixer.

The fillers employed in the present invention are selected from the group consisting of carbon blacks, talcs, ground calcium carbonate, water precipitated calcium carbonate and delaminated, calcined and hydrated clays and mixtures thereof. These fillers are incorporated into the blend composition at about 25 to about 350 parts by weight per 100 parts by weight of the sulfonated EPDM terpolymer, more preferably at about 50 to about 350; and most preferably at about 50 to about 300. Typically, these fillers have a particle size of about 0.03 to about 20 microns, more preferably about 0.3 to about 10, and most preferably about 0.5 to about 10. The oil absorption as measured by grams of oil absorbed by 100 grams of filler is about 10 to about 100, more preferably about 10 to about 85, and most preferably about 10 to about 75. Typical fillers employed in this invention are illustrated in Table III.

proportions as a means for modification of the rheological properties of the blend compositions as well as the physical properties of the polymeric article. Typically, the crystalline polyolefinic thermoplastic is added to the blend composition at a concentration level of less than about 100 parts by weight based on 100 parts by weight of the sulfonated EPDM terpolymer, more preferably at less than about 75; and most preferably at about 5 to about 50.

The crystalline polyolefin is characterized as a polymer of an alpha-olefin having a molecular weight of at least 2,000 preferably at least 10,000 and most preferably at least 20,000. This material comprises substantially an olefin but may incorporate other monomers, for example, vinyl acetate, acrylic acid, methyl acrylate, ethyl acrylate, sodium acrylate, etc. The preferred polyolefins are selected from the group consisting of polymers of $C_2$ to $C_4$ alphaolefins. Most preferably, the polyolefins are selected from the group consisting of polyethylene, polybutene, propylene, and ethylene-propylene copolymers. It is critical that the crystalline polyolefin have a degree of crystallinity of at least 40%.

TABLE III

| Filler | Code # | Oil Absorption grams of oil/100 grams of filler | Specific Gravity | Average Particle Size Micron | pH |
|---|---|---|---|---|---|
| Calcium carbonate ground | Atomite | 15 | 2.71 | | 9.3 |
| Calcium carbonate precipitated | Purecal U | 35 | 2.65 | .03–.04 | 9.3 |
| Delaminated clay | Polyfil DL | 30 | 2.61 | 4.5 | 6.5–7.5 |
| Hydrated clay | Suprex | | 2.6 | 2 | 4.0 |
| Calcined clay | Icecap K | 50–55 | 2.63 | 1 | 5.0–6.0 |
| Magnesium silicate (talc) | Mistron Vapor | 60–70 | 2.75 | 2 | 9.0–7.5 |

Waxes used in the instant invention are derived from various sources: petroleum waxes covering paraffin and micro-crystalline wax; synthetic waxes including polyethylene and Fischer-Tropsch wax; natural waxes from plants, insects and animals. The petroleum and synthetic waxes are most important for the present invention.

Other than paraffinic, naphthenic and aromatic hydrocarbon groups waxes can contain polar functional groups such as alcohols, ketones, and esters. It is preferred that the waxes used in this invention be predominantly non-polar since polar functional groups function as plasticizers for the ionic sulfonate groups. Excessive plasticization is undesirable. The largest percentage of polar functional groups in waxes are those containing oxygen by virtue of hydrocarbon oxidation. For the purpose of this invention a wax is considered to be non-polar when it contains less than 4.0 wt. %, more preferably less than 2.0 wt. % oxygen.

The waxes are incorporated into the blend composition at a concentration level of about 2 to about 20 parts by weight per 100 parts by weight of the sulfonated EPDM terpolymer, more preferably about 2 to 15, and most preferably about 7 to about 15.

The waxes employed in the present invention have a softening point of about 125° F. to about 220° F., more preferably about 135° F. to about 200° F., and most preferably about 150° F. to about 200° F. The preferred waxes have an $\overline{M}n$ of about 300 to about 4000. These waxes are typically crystalline wherein the percent crystallinity can vary depending on the composition of the wax and the $\overline{M}n$.

A crystalline polyolefinic thermoplastic can be incorporated into the powder blend composition in minor Both high and low density polyethylene are within the scope of the instant invention. For example, polyethylenes having a density from 0.90 to 0.97 gms/cc are generally included. Polypropylene polymers having intermediate and high densities are the preferred examples of the polypropylene materials useful in the instant invention. These materials will have a density from 0.88 to 0.925 gms/cc. The polyethylene or polypropylene can also be combined as copolymers thereof so long as adequate crystallinity is obtained in said combination. Thus, block copolymers wherein polyethylene or polypropylene is present in crystalline form are effective.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

A series of EPDM cements were prepared by dissolving 100 g of EPDM in 1000 ml of n-hexane. The EPDM had a Mooney viscosity of about 20 ($M_L$, 1+8, 212° F.) and contained about 55 weight % ethylene and about 5 weight % 5-ethylidene-2-norbornene. Run A was sulfonated by adding 33.3 ml of a 1 molar solution of acetyl sulfate in dichloromethane. The acetyl sulfate solution was prepared by adding 55.43 ml of acetic anhydride and 14.0 ml of concentrated sulfuric acid to 180.58 ml of di:chloromethane. To the EPDM-hexane cements of runs B, C and D were added 5 meq, 10 meq and 20 meq of monomeric 5-ethylidene-2-norbornene per 100 grams of EPDM, respectively. These cements were then sulfonated with appropriate excesses of reagents to account for the reactivity of the monomeric ENB, which has been shown to be 2 moles SO₃H per mole of monomeric ENB. The exact levels of acetyl sulfate solution used are given in Table IV.

TABLE IV

| Run | Acetyl Sulfate Solution Added ml |
|---|---|
| A | 33.3 |
| B | 43.3 |
| C | 53.3 |
| D | 73.3 |

In all cases the sulfonation reactions were continued for 30 minutes. The reactions were then terminated by adding 80 ml of methanol, followed by 0.2 gm of Irganox 1010.

Approximately 10 ml of the respective free acid cements are removed and isolated. In this isolation procedure, the samples were steam stripped by pouring the cement directly into unagitated boiling water. The resultant polymer formed into a single large particle. After stripping was complete the polymer was dried on a rubber mill at about 100° F. The samples were then submitted for Dietert sulfur analysis, the results of which are shown in Table V.

TABLE V

| Run | Monomeric ENB Added Meq/100g EPDM | Contained Sulfur (Meq/SO₃H/100g EPDM |
|---|---|---|
| A | 0 | 33.0 |
| B | 5 | 42.6 |
| C | 10 | 48.7 |
| D | 20 | 59.6 |

The remainder of cements were then isolated as powders as follows: The cement was first broken up into small particles suspended in water using a Waring blender in which is charged about one volume of cement to one volume of water. The water was at about 20° C. The slurry was then batch steam stripped in a four liter beaker fitted with a high speed agitator. After stripping the powdered polymeric sulfonic acids were washed four times under agitation with fresh water and twice with fresh water using a bench scale Gifford-Wood homo-mixer. The final products had a particle size ranging from 10 to 20 mesh.

Each of the wet free acid powders were then split into two portions: one portion was dried at 70° C. in a laboratory hot air fluid bed dried while the remainder was dried at 100° F. on a rubber mill. The respective dried free acids were then submitted for Dietert sulfur analysis. Table VI gives the contained sulfur levels for the dried powdered free acids.

TABLE VI

| Run | Monomeric ENB Added Meq/100g EPDM | Contained Sulfur Meq/SO₃H/100g EPDM | |
|---|---|---|---|
| | | Fluid Bed Dried | Mill Dried |
| A | 0 | 33.0 | 30.5 |
| B | 5 | 29.5 | 32.7 |
| C | 10 | 34.3 | 36.2 |

TABLE VI-continued

| Run | Monomeric ENB Added Meq/100g EPDM | Contained Sulfur Meq/SO₃H/100g EPDM | |
|---|---|---|---|
| | | Fluid Bed Dried | Mill Dried |
| D | 20 | 44.2 | 37.2 |

This example shows that the free sulfonic acid form of monomeric ENB can effectively be removed from the polymeric free acid when the polymer cement is formed into a fine slurry before steam stripping. The small particle size allows effective water washing to occur and thus the efficient removal of water soluble materials from the polymer.

EXAMPLE 2

A series of EPDM cements were prepared according to the methods and procedures described in Example 1.

The polymeric free acids of this series were neutralized by the addition of a solution of ammonium acetate in methanol and water and the neutralized cements were stabilized with Irganox 1010. The compositions of the runs in this series are given in Table VII.

The dried neutralized powders were analyzed for contained sulfur and nitrogen. The data is shown in Table VIII and is compared to the amounts of sulfur and nitrogen originally added.

TABLE VII

| | Run A | Run B | Run C |
|---|---|---|---|
| Hexane (ml) | 1000 | 1000 | 1000 |
| EPDM (gm) | 100 | 100 | 100 |
| Monomeric ENB Solution (ml)[1] | 0 | 25 | 50 |
| Acetic Anhydride (ml) | 5.032 | 5.981 | 6.926 |
| Concentrated Sulfuric Acid (ml) | 1.868 | 2.430 | 2.990 |
| Ammonium Acetate (gm) | 4.625 | 5.396 | 6.166 |
| Methanol (ml) | 80 | 80 | 80 |
| Distilled Water (ml) | 6 | 7 | 8 |
| Irganox 1010 (gm) | 0.1 | 0.1 | 0.1 |

[1]0.2 N monomeric ENB in hexane

TABLE VIII

| | | | Neutralized Gums | |
|---|---|---|---|---|
| Run | SO₃H Added Meq/ 100g EPDM | Nitrogen Added Meq/ 100g EPDM | SO₃H Retained Meq/ 100g EPDM | Nitrogen Retained Meq/ 100g EPDM |
| A | 33.3 | 60 | 27.6 | 24.2 |
| B | 43.3 | 70 | 37.9 | 39.3 |
| C | 53.3 | 80 | 44.0 | 46.2 |

This example shows that amine salts of sulfonated monomeric ENB can be efficiently removed from the amine neutralized sulfonated polymer using the preformed slurry process to facilitate fine particle formation.

EXAMPLE 3

A series of EPDM cements were prepared by dissolving 100 g of EPDM in 1000 ml of n-hexane. The EPDM had a Mooney viscosity of about 20 ($M_L$, 1+8, 212° F.) and contained about 55 weight % ethylene and about 5 weight % 5-ethylene-2-norbornene. Run A was the control and the cement was sulfonated directly by the addition of acetic anhydride and concentrated sulfuric acid. To the EPDM hexane cements of Runs B and C were added 5 meq and 10 meq of monomeric 5-ethylidene-2-norbornene per 100 gm of EPDM respectively. These cements were then sulfonated and neutralized with appropriate excesses of reagents to account for the reactivity of the monomeric ENB present. The neutralization of all runs was affected by the addition of a solution of anhydrous sodium acetate in methanol and water. The cements were stabilized with Irganox 1010. The composition of the three runs are given in Table IX.

TABLE IX

|  | Run A | Run B | Run C |
| --- | --- | --- | --- |
| Hexane (ml) | 1000 | 1000 | 1000 |
| EPDM (gm) | 100 | 100 | 100 |
| Monomeric ENB Solution (ml)[1] | 0 | 25 | 50 |
| Acetic Anhydride (ml) | 5.032 | 5.981 | 6.926 |
| Concentrated Sulfuric Acid (ml) | 1.868 | 2.430 | 2.990 |
| Anhydrous Sodium Acetate (gm) | 4.92 | 5.74 | 6.56 |
| Methanol (ml) | 80 | 80 | 80 |
| Distilled Water (ml) | 6 | 7 | 8 |
| Irganox 1010 (gm) | 0.1 | 0.1 | 0.1 |

[1] 0.2 N Monomeric ENB in hexane

The cements were then isolated as powders following the procedures described in Example 1. The wet powders were then dried at 70° C. in a laboratory fluid bed drier. The final powders had a particle size range of 10 to 20 mesh.

The dried neutralized powders were submitted for contained sulfur and sodium. This data is shown in Table X and is compared to the amounts of sulfur and sodium originally added.

TABLE X

| Run | $SO_3H$ Added Meq/ 100g EPDM | Sodium Added Meq/ 100g EPDM | $SO_3H$ Retained Meq/ 100g EPDM | Sodium Retained Meq/ 100g EPDM |
| --- | --- | --- | --- | --- |
| A | 33.3 | 60 | 29.5 | 56.8 |
| B | 43.3 | 70 | 37.9 | 65.5 |
| C | 53.3 | 80 | 44.1 | 75.5 |

This example shows that monovalent metal salts of sulfonated monomeric ENB can be efficiently removed from the metal neutralized sulfonated polymer when the polymer cement is dispersed as a fine powder in water prior to steam stripping. This process provides a significant improvement in polymer washing efficiency for the removal of water soluble materials from the polymer.

EXAMPLE 4

An experiment identical to Example 3 was run in which the polymeric free acid cements were neutralized with zinc. The neutralization was conducted by adding a solution of zinc acetate-dihydrate dissolved in methanol and water. The compositions of the runs in this series are given in Table XI.

The contained sulfur levels in the dried neutralized powders are compared to the amounts originally added and the sulfur level found in the polymeric-free acid in Table XII. In the case where neutralization is effected with a divalent counter ion the efficiency of water washing of residual water soluble di-valent water salts is not as good as free acids or monovalent salts.

TABLE XI

|  | Run A | Run B | Run C | Run D |
| --- | --- | --- | --- | --- |
| Hexane (ml) | 1000 | 1000 | 1000 | 1000 |
| EPDM (gm) | 100 | 100 | 100 | 100 |
| Monomeric ENB Solution (ml)[1] | 0 | 25 | 50 | 100 |
| Acetic anhydride (ml) | 5.046 | 6.549 | 8.061 | 11.075 |
| Concentrated sulfur acid (ml) | 1.868 | 2.429 | 2.990 | 4.112 |
| Zinc acetate di-hydrate (gm) | 6.585 | 7.683 | 8.780 | 10.977 |
| Methanol (ml) | 80 | 80 | 80 | 80 |
| Distilled water (ml) | 4 | 4 | 4 | 4 |
| Irganox 1010 (gm) | 0.1 | 0.1 | 0.1 | 0.1 |

[1] 0.2N monomeric ENB in hexane

TABLE XII

| Run | $SO_3H$ Added meq/100g | Free Acid $SO_3H$ meq/100g EPDM | Neutralized Gum $SO_3H$ Retained meq/100g EPDM |
| --- | --- | --- | --- |
| A | 33.3 | 32.4 | 32.7 |
| B | 43.3 | 37.8 | 43.3 |
| C | 53.3 | 38.8 | 45.7 |
| D | 73.3 | 56.7 | 62.1 |

EXAMPLE 5

To a clean glass-lined 50 gal. Pfaudler reactor was charged 23.87 gal. of n-hexane. Twenty pounds of EPDM containing about 55 wt. % ethylene and about 5 wt. % 5-ethylidene-2-norbornene and having a Mooney viscosity of about 20($M_L$, 1+8, 212° F.) was then charged to the reactor with agitation. The reactor was heated to 70° C. for about 8 hours to effect dissolution of the EPDM. The reactor was then cooled to 25° C. then with agitation 1.591 pounds of acetic anhydride and 0.658 pounds of concentrated sulfuric acid were added. After 30 minutes, the sulfonation was terminated through the addition of 1.909 gallons of methanol.

The terminated free polymeric sulfonic acid cement was then pumped from the reactor and mixed with hot water (85°-95° C.) in the nozzle assembly preceding the "hi-shear" mixer. On passing through the "hi-shear" mixer the cement was dispersed as small, discrete particles into the water forming a slurry. This cement-water slurry was then fed directly into a batch steam stripper where the hexane removal was effected.

The wet powder was then removed from the stripper and dried in a Fitzpatrick FA-75 fluid-bed drier. The drier operating air temperature was held at 150° F. The drier batch size was about 15 pounds of dry polymer. Drying to a final moisture content of less than 2 wt. % was effected in about 3 hours from an initial moisture content of 65 wt. %.

The sulfur content of the free polymeric acid was 1.03 wt. % by Dietert analysis which corresponds to 33.0 meq sulfonic acid/100 g polymer.

The wet polymeric sulfonic acid as removed from the steam stripper was in the form of a free-flowing powder. The particle size was in the range of 10 to 20 mesh. The free-flowing character of the polymeric acid was maintained through the drying process as was the particle size. Substantial matting and clumping of the dried powder occurred after 1 week of shelf storage.

Since many modifications and variations of this invention may be made without departing from the spirit or scope of the invention thereof, it is not intended to limit the spirit or scope thereof to the specific examples thereof.

What is claimed is:

1. A process for forming a sulfonated EPDM terpolymer having less than 1.25 wt. % of a sulfonated derivative of monomeric 5-ethylidene-2-norbornene therein, which comprises the steps of:
   (a) contacting a terminated cement of an EPDM terpolymer having a monomeric ENB therein dissolved in a hydrocarbon solvent with a sulfonating agent to form an unneutralized sulfonated EPDM terpolymer and a water soluble sulfonated derivative of said monomeric 5-ethylidene-2-norbornene;
   (b) adding water to said cement, which causes the viscosity of said cement to increase or a gel to form, a volume ratio of said water to said cement being about 60/1 to about 2/1;
   (c) emulsifying under high shear the blend of said water and said cement to form a slurry of particles of said sulfonated EPDM terpolymer in said water, wherein said water soluble sulfonated derivative of said 5-ethylidene-2-norbornene is solubilized in said water;
   (d) steam stripping said slurry under high speed agitation thereby forming said solvent from said slurry;
   (e) separating said particles of said powder of said sulfonated EPDM terpolymer from said water;
   (f) washing said powder of said sulfonated EPDM terpolymer with water thereby further removing said water soluble sulfonated derivative of said monomeric 5-ethylidene-2-norbornene from said sulfonated EPDM terpolymer; and
   (g) drying said particles of said powder of said sulfonated EPDM terpolymer, said particles have a particle size of about 500 to about 3,000 microns.

2. The process of claim 1, further including the step of neutralizing said sulfonated polymer with a neutralizing agent prior to the addition of said water to said cement; said neutralizing agent is a basic salt, wherein a counterion of said basic salt is selected from the group consisting of ammonium, and Group IA of the Periodic Table of Elements.

3. The process of claim 2, wherein said counterion is sodium or potassium.

4. The process of claim 2, wherein said neutralized sulfonated polymer has about 5 to about 250 meq. of sulfonate groups per 100 grams of said neutralized sulfonated EPDM terpolymer.

5. The process of claim 1 or 2, wherein said powder has a volume density of about 15 to about 30 pounds/cubic foot.

6. The process of claim 1 or 2 further including adding a non-polar process oil to said cement prior to adding said water to said cement, said oil being added at a concentration of about 20 to about 200 parts by weight per 100 parts by weight of said sulfonated EPDM terpolymer.

7. The process of claim 1 or 2, further including adding a preferential plasticizer to said cement prior to adding said water to said cement, said preferential plasticizer added at a concentration of less than about 60 parts by weight per 100 parts by weight of said sulfonated EPDM terpolymer.

8. The process of claims 1, 2, 6 or 7 further including dry blending a filler, or a polyolefinic thermoplastic having a molecular weight of at least 2,000 with said formed powder.

* * * * *